United States Patent [19]

Stangroom

[11] 4,444,298

[45] Apr. 24, 1984

[54] VISCOUS SHEAR CLUTCH

[75] Inventor: James E. Stangroom, Castleton, England

[73] Assignee: The Secretary of State for Defence in Her Britannic Majesty's Government of the United Kingdom of Great Britain and Northern Ireland, London, England

[21] Appl. No.: 282,296

[22] Filed: Jul. 10, 1981

[51] Int. Cl.³ .................... F16D 27/00; F16D 29/00; F16D 27/12
[52] U.S. Cl. .................................. 192/21.5; 192/21; 192/58 B; 192/48.2
[58] Field of Search .................. 192/21.5, 58 R, 58 B, 192/20, 21, 51, 48.2

[56] References Cited

U.S. PATENT DOCUMENTS 3,144,921  8/1964  Martinek ........................... 192/21.5

FOREIGN PATENT DOCUMENTS 691396  5/1953  United Kingdom .
728501  4/1955  United Kingdom .
985827  3/1965  United Kingdom .

Primary Examiner—George H. Krizmanich
Assistant Examiner—M. Manley
Attorney, Agent, or Firm—Pollock, Vande Sande and Priddy

[57] ABSTRACT

An electro-rheological fluid is used as a transmission fluid between confronting, rotatable sets of clutch plates across which a potential difference can be applied so as to vary the viscous shear characteristic of the interjacent fluid. Differential arrangements of the clutch plates ensure cancellation of residual drag effects and the clutch can be electrically varied substantially from complete disengagement to solid engagement.

9 Claims, 6 Drawing Figures

VISCOUS SHEAR CLUTCH

TECHNICAL FIELD

This invention relates to a viscous shear clutch which is variable by electrical means.

BACKGROUND ART

Viscous shear clutches are known in which a viscous fluid such as a silicone oil is used to transmit rotary motion from a drive shaft to a driven shaft via suitable coupling members. Such clutches rely upon mechanical adjustment of the coupling members to vary the torque transmitted by the fluid and suffer from the disadvantage that conditions of total disengagement and solid engagement are difficult to achieve. This latter disadvantage stems from the Newtonian flow properties of the viscous fluid, i.e. the fluid shears at a rate directly proportional to the applied shear stress, and consequently no matter how little stress is imposed by the coupling members, some shearing of the fluid will always occur.

Compositions are known in which the flow properties undergo variation when subjected to electric fields. These compositions, previously called 'electroviscous fluids' but now more distinctively known as 'electro-rheological fluids', comprise slurries of finely divided hydrophilic solids in hydrophobic liquids. In the absence of an electric field these fluids behave in Newtonian fashion but, when an electric field is applied the fluid behaves approximately as a 'Bingham Plastic' and no shearing whatsoever takes place for all shear stresses up to a maximum, known as the 'yield-point', the value of which depends upon the composition of the fluid and the electric field applied. For a given fluid, the yield-point is normally linearly dependent upon the voltage gradient applied above a threshold level, and may be defined as $k(E-E_o)$ where $E$ and $E_o$ are the applied and the threshold voltage gradients respectively and $k$ is the proportionality constant. When a shear stress greater than the yield-point is applied to the fluid, shearing occurs at a rate proportional to the difference between the yield-point and the stress.

The advantage of electrical control that can be achieved by using an electro-rheological fluid in a viscous shear clutch was first disclosed by W. M. Winslow in his U.S. Pat. No. 2,417,850, in which he described a simple disc type clutch in which the discs were separated by electro-rheological fluid. This type of clutch is capable of being locked into substantially solid engagement for stresses below the yield-point when an appropriate voltage is applied between the discs but, like all other viscous shear clutches, the natural viscosity of the fluid, even when all applied voltage is removed, still prevents total disengagement.

DISCLOSURE OF THE INVENTION

The present invention seeks to apply the flow properties of an electro-rheological fluid to a viscous shear clutch so as to provide an electrically controllable clutch having a transmission range which more fully extends from complete disengagement to solid engagement.

In accordance with the present invention a viscous shear clutch includes an input shaft, at least two input pluralities of electrically conductive interconnected drive plates rotatable by the input shaft, at least two output pluralities of electrically conductive interconnected driven plates, the driven plates of each output plurality being alternately confronted with the drive plates of a respective one of the input pluralities so as to define evenly spaced interstices, an output shaft rotatable by the output pluralities, electrical connecting means to each plurality of drive plates and driven plates for the application of control voltages, and an electro-rheological fluid disposed throughout the interstices.

In a preferred arrangement permitting differential cancellation of inherent viscous drag effects to be made, the two input pluralities may, in a first aspect, both be rotatable in the same direction by the input shaft, the output shaft being rotatable differentially by the torques imparted to the two output pluralities.

Alternatively, in a second aspect of the preferred arrangement the two input pluralities may be contra-rotatable by the input shaft, the output shaft being rotatable conjointly by the torques imparted to the two output pluralities.

The drive plates and the driven plates may all conveniently be of cylindrical form disposed concentrically to rotate about their mutual axis. Alternatively they may all be disc shaped and disposed in parallel array to rotate about a common perpendicular axis through their centers.

BRIEF DESCRIPTION OF THE DRAWINGS

Embodiments of the invention will now be described by way of example only with reference to the accompanying drawings of which

BEST MODE FOR CARRYING OUT THE INVENTION

Figure 1:
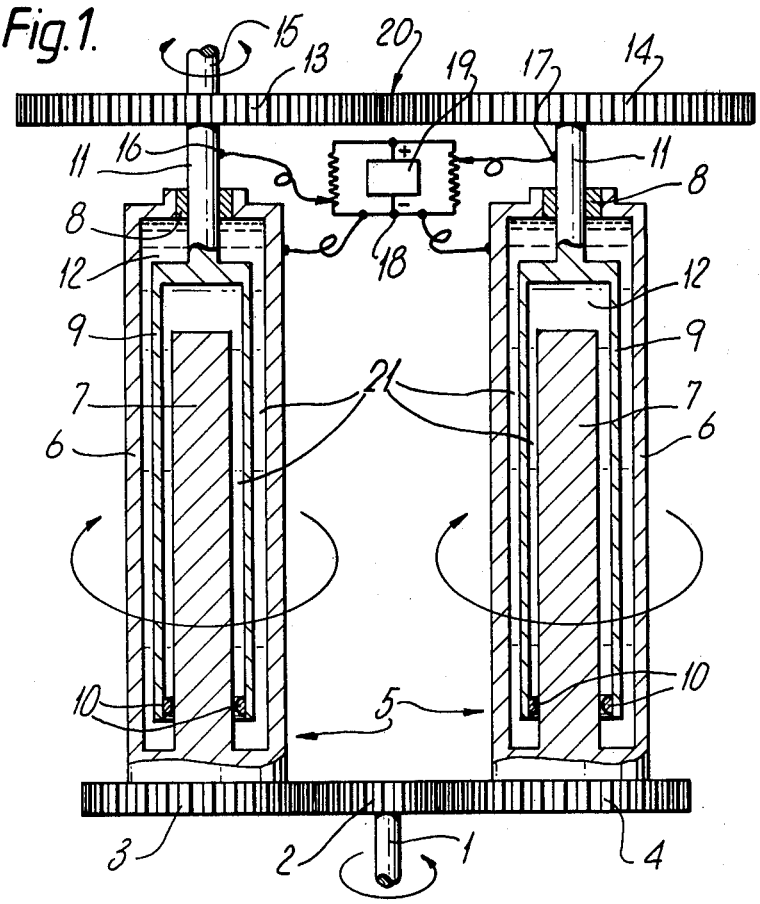
FIG. 1 is a diagramatic representation of a twin cylinder electro-rheological fluid clutch having cylindrical plates.

The clutch illustrated in FIG. 1 embodies the first aspect of the preferred arrangement and comprises an input shaft 1 carrying a gear 2 which is engaged with two opposed gears 3 and 4. The gears 3 and 4 are respectively attached to twin cylinders 5 each comprising a cylindrical drive plate 6 of electrically conductive material having a coaxially attached inner cylindrical drive plate 7 of electrically conductive material and a sealed bearing 8 coaxially located at the end remote from the gears 3 and 4.

A cylindrical driven plate 9 also of electrically conductive material and having internally protruding, no conductive alignment studs 10 is coaxially located interjacent the drive plates 6 and 7 defining therewith cylindrical interstices 21. Coaxially attached to the driven plate 9 is a shaft 11 which extends through the sealed bearing 8.

The interstices 21 between the drive plates 6 and 7 and the driven plates 9 are completely filled with an electro-rheological fluid 12. One suitable fluid is a suspension of 30% by volume of lithium polymethacrylate in chlorinated biphenyl, as described in British Pat. No. 1,570,234 and having a no-field viscosity at 30° C. of about 100 mPa.s, a k value of about 2 Pa.mm/V and a threshold value $E_o$ of about 0.8 kV/mm.

The two shafts 11 carry inter-engaged, electrically non-conductive gears 13 and 14 respectively beyond which, one of the shafts is extended to provide an output shaft 15.

Electrical connections 16 and 17 are made separately to the two driven plates 9 and an electrical connection 18 is made to the two drive plates 6 mutually such that a control voltage from a voltage source 19 can be applied between either one of the two driven plates and its respective drive plate so as to increase the shear resistance of the interjacent fluid 12.

In operation, when the input shaft 1 is rotated, both the gears 3 and 4 rotate in one direction in opposition to the direction of the gear 2. If the flow properties of the fluid 12 are identical in both cylinders 5, as will be the case when zero or equal voltages are applied across their respective plates, the torque transmitted from the drive plates to the gears 13 and 14 via the fluid 12, the driven plates 9 and the shafts 11, are of equal amplitude and direction and the gears are subsequently held in balanced opposition at their engaged interface 20, with the result that no net rotation of the output shaft 15 takes place.

When the flow properties of the fluid in the twin cylinders 5 are varied differentially by the application of a control voltage to the plates of one or the other of the pair, the output shaft 15 will rotate at a speed and in a direction directly dependent upon the differential torque transmitted to the two gears 13 and 14 respectively. The shear resistance of the electro-rheological fluid 12 in either one of the cylinders can be continuously increased by increasing the control voltage until the plates become solidly locked together, thus providing a highly efficient transmission coupling with minimum heat generation in the locked cylinder. The plates of the other, disengaged cylinder will of course then be rotating relatively at twice the speed of the input shaft 1 and heat will be generated in this cylinder by the viscous drag between the plates. However, the twin cylinder arrangement ensures that heat generated in the disengaged cylinder is not transferred to the engaged cylinder where it could increase adversely the electrical power required to maintain the locked condition. Clearly, the gears 14 and 4 can be arranged to be disengageable by external means (not shown) from the gears 13 and 2 respectively during periods when the cylinder 5 driving the gear 13 is solidly engaged, in order to minimize heat generation in the other cylinder.

The cylindrical form of the drive and driven plates provides a high surface to volume ratio enabling heat to be readily dissipated and, by making the radius of the cylinders small in comparison with their length, the shearing speed in the fluid can be kept as low as possible so as to minimize heating effects. For simplicity of presentation, the number of interfaced cylindrical plates illustrated in FIG. 1 has been kept to a minimum, but obviously a larger number can be employed.

Figure 2:
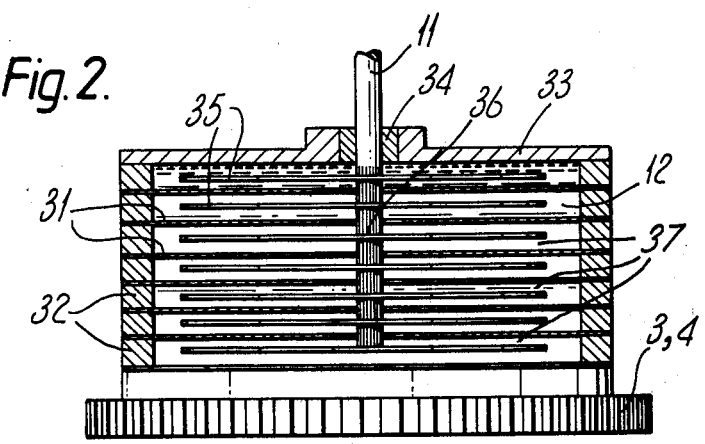
FIG. 2 is a diagramatic representation of an alternative flatplate assembly for use in place of each cylindrical plate assembly of the clutch illustrated in FIG. 1.

An alternative arrangement of drive and driven plates for use in place of the cylindrical plates in the cylinder 5 of the preceding embodiment is illustrated in FIG. 2. In this arrangement a stack of parallel annular drive plates 31 axially separated by annular spacers 32, all of electrically conductive material, is mounted upon the gear 3 (or 4) and enclosed by an end cover 33 containing an axial sealed bearing 34. A corresponding stack of driven plates 35 supported upon a splined shaft 36 is interleaved with the drive plate stack so that the plates 31 and 35 are alternately disposed and conjointly define interstices 37. The shaft 36 extends through the bearing 34 where it replaces the shaft 11 of the previous embodiment. The interstices 64 between the drive and driven plates are again filled with the electro-rheological fluid 12 and electrical connections (not shown) are made to the drive plate stack and the driven plate stack so that a voltage may be applied between them. Operation is exactly as described for the cylindrical plate form.

This flat-plate arrangement is simpler to construct than the cylindrical form and has the advantage that the inertia effects at the output shaft are relatively small. Furthermore the number of drive plates and driven plates employed can be readily multiplied to provide a larger working area so as to increase the absolute torque of the clutch.

Figure 3:
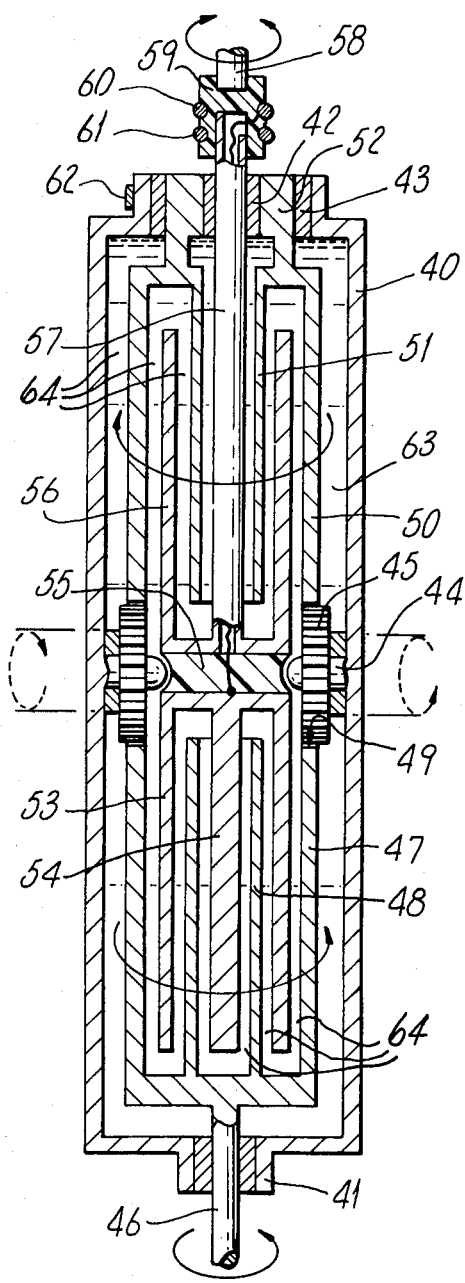
FIG. 3 is an axially sectioned view of a fully enclosed cylindrical plate electro-rheological fluid clutch having separately rotatable drive plate assemblies and mutually rotatable driven plate assemblies.

A more compact second embodiment of the invention in which two sets of cylindrical drive plates are mutually rotated about a common axis is illustrated in FIG. 3 and falls within the second aspect of the preferred arrangement. A cylindrical housing 40 having a sealed shaft bearing 41 at one end, and inner and outer coaxial sealed shaft bearings 42 and 43 respectively at the other, is provided internally with two diametrically opposed stub axles 44 located midway along its length and each carrying an idler gear 45.

An input shaft 46 journalled in the bearing 41 is attached to concentric drive cylinders 47 and 48, the cylinder 47 having a toothed end-face 49 (or gear ring) which meshes with the idler gears 45.

Similar concentric drive cylinders 50 and 51 are opposingly meshed with the idler gears 45 and extend into a short hollow shaft 52 which is journalled in the outer bearing 43.

Driven cylinders 53 and 54 concentrically interleaved with the drive cylinders 47 and 48 to define interstices 64, are attached to one end face of a non-conductive sheave 55 rotatably located between the opposed stub axles 44 and a second similar pair of stub axles (not shown) angularly displaced therefrom by 90 degrees. Alternatively a set of three axles 44 and idler gears 45 may be employed spaced at 120 degree intervals. The other end face of the sheave 55 supports a second pair of driven cylinders 56 and 57 which are concentrically interleaved with the drive cylinders 50 and 51 defining further interstices 64. The driven cylinder 57 is hollow and extends through the inner bearing 42 to connect with an output shaft 58 via a non-conductive sleeve 59 which carries two slip-rings 60 and 61.

The two sets of driven cylinders 56/57 and 53/54 are electrically connected to the slip-rings 60 and 61 respectively. A terminal 62 provided on the housing has electrical continuity with the drive cylinders 47, 48, 50 and 51 via the axles 44 and the idler gears 45. The inter-cylinder interstices 64 are entirely filled with electro-rheological fluid 63.

In operation, when the input shaft 46 is rotating, the drive cylinders 50 and 51 are turned by the idler gears 45 in a direction opposite to that at which the drive cylinders 47 and 48 are being turned and at the same speed. The viscous drag imposed upon the corresponding two sets of driven cylinders is therefore equal and opposite provided that the viscosity of the fluid is uniform throughout and consequently no net rotation is imparted to the output shaft 58. A control voltage applied between the terminal 62 and one or the other of the slip-rings 60 and 61 increases the shear resistance of the fluid between the respective set of drive and driven cylinders, i.e., upper or lower as drawn, so as to engage that set and rotate the output shaft 58 in a corresponding forward or reverse direction.

The idler gear system providing the opposing rotation of the upper drive cylinder may alternatively be replaced by a two-part lay shaft system external to the housing (not shown) so as to avoid any possible damage to the electro-rheological fluid particles resulting from being nipped in the gears. It will be apparent to those skilled in the art that a directly analogous, alternative flat-plate arrangement of this embodiment, employing annular plates instead of cylinders is also possible.

Figure 4:
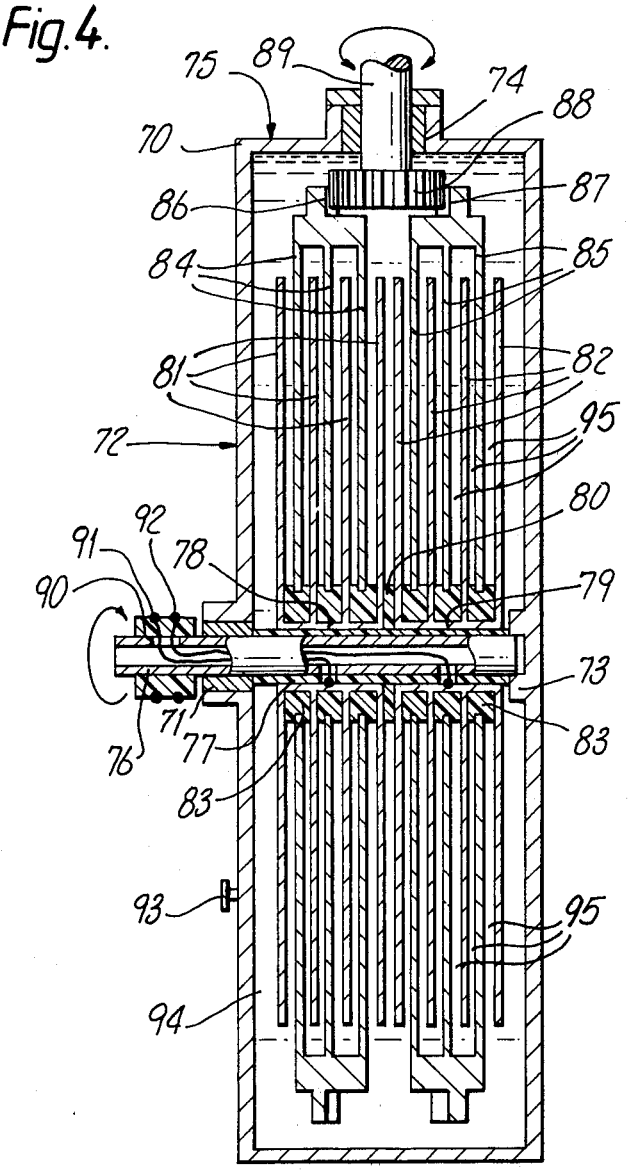
FIG. 4 is an axially sectioned view of a fully enclosed flatplate electro-rheological fluid clutch having mutually rotatable drive plate assemblies and separately rotatable driven plate assemblies.

A third embodiment illustrated in FIG. 4 is a flat-plate clutch in which all the drive plates are mutually rotated by the input shaft and the driven plates are disposed as two independently rotatable sets. This clutch provides a 90 degree displacement between the input and output shafts, and falls within the first aspect of the preferred arrangement. The embodiment comprises a cylindrical housing 70 having a sealed input shaft bearing 71 in one end wall 72, an end bearing 73 in the opposing end wall and a sealed output shaft bearing 74 radially disposed in the cylindrical wall 75. Attached to a hollow input shaft 76 journalled in the bearings 71 and 73 is a non-electrically conductive sleeve 77 supporting two identical conductive sleeves 78 and 79 separated axially from one another by a non-conductive spacer ring 80. The sleeves 78 and 79 each bear a stack of four axially spaced disc shaped conductive drive plates 81 and 82 respectively.

Peripherally grooved PTFE spacer rings 83 are provided interjacent the drive plates, which rings slideably locate with the respective inner edges of two stacks of three annular driven plates 84 and 85 which driven plates define with the drive plates interstices 95. The outer edges of each stack of driven plates 84 and 85 are mutually attached to gear rings 86 and 87 respectively. These two gear rings are opposingly engaged with a gear 88 attached to an output shaft 89 which is journalled in the bearing 74.

A non-conductive collar 90 attached to the input shaft 76 outside the housing carries two slip-rings 91 and 92 which are electrically connected to the conductive sleeves 78 and 79 respectively, whereby control voltages may be applied to the two stacks of drive plates 81 and 82 respectively. A reference terminal 93 provided on the housing 70 has electrical continuity with both sets of driven plates 84 and 85 via the gear rings 86 and 87, gear 88, shaft 89 and bearing 74.

The housing 70 and interstices 95 are filled with electro-rheological fluid 94 and operation is again similar to that of the two previous embodiments. With no control voltages applied and the input shaft 76 rotating, equal torques are transmitted from the rotating drive plates 81 and 82 to the two sets of driven plates 84 and 85 respectively by viscous drag between them. These torques oppose one another at the gear 88 and no net rotation of the output shaft 89 occurs. As soon as a control voltage is applied between the driven plates 84 and 85 and one or the other of the sets of drive plates 81 or 82 the balance is disturbed and a resultant torque will be imposed upon the shaft 89.

Clearly, more than one output shaft may be simultaneously driven by the gear rings 86 and 87 of this embodiment, further gears 88, shafts 89 and bearings 74 being provided at separate locations around the periphery of the rings (not shown).

Figure 5:
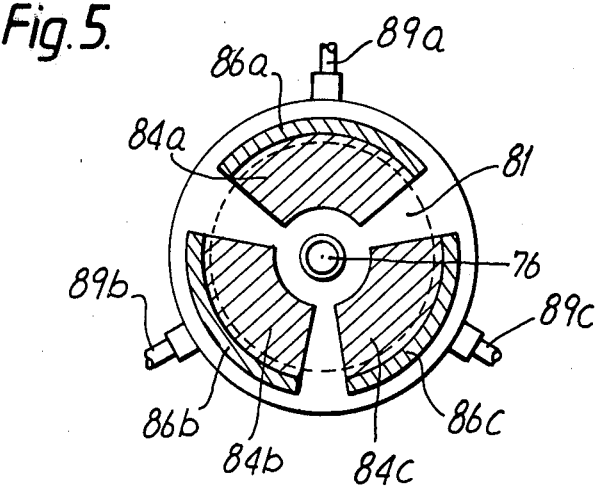
FIG. 5 is a diagramatic representation of an alternative driven plate for use with the clutch illustrated in FIG. 4 having three independently controllable output shafts of limited angular movement.

In applications where the input and output shafts are required to rotate only through limited angular deflections of up to plus or minus 20 degrees, rather than perform continuous rotation, the gear 88 may be replaced by a simple crossbar (not shown) mounted on the shaft 89 and pivotally attached at its two ends respectively to the rings 86 and 87. The sealed shaft bearing 74 may then comprise a flexible plug bonded between the shaft and the housing. Furthermore, where multiple independently controllable outputs of limited angular amplitude are required, the rings 86 and 87 and their driven plates 84 and 85 may be divided into separate sectors a, b and c, as illustrated in FIG. 5, each cooperating pair of sectors driving its own respective output shaft. Of course in this arrangement the drive plates must be made electrically continuous with the housing and the driven plates isolated from the housing so that individual electrical connections can be made to each sector.

Figure 6:
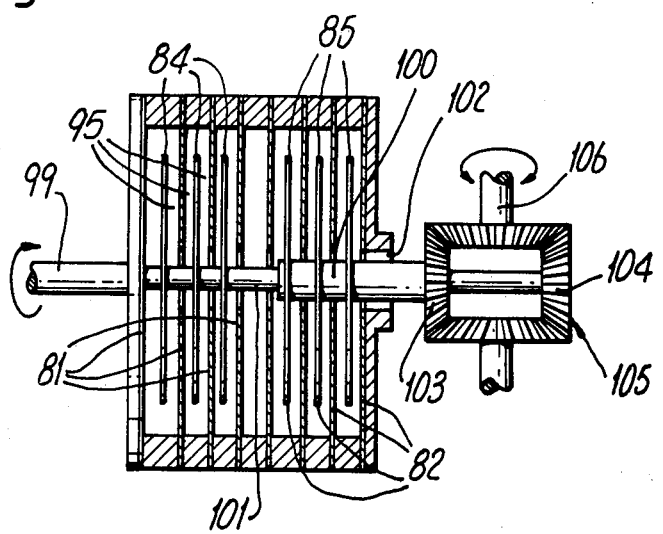
FIG. 6 is a diagramatic representation of a variant of the flatplate clutch illustrated in FIG. 4 having external gearing.

A fourth embodiment also within the first aspect of the preferred arrangement is illustrated in FIG. 6 and is a variant of the flat-plate clutch of FIG. 4 wherein the gears are located outside the housing. As in the clutch of FIG. 4 the drive plates rotate mutually and the two sets of driven plates are separately rotatable, but in this variant the edges by which the plates are attached are reversed; i.e., the drive plates 81 and 82 are inter-connected via their outer edges to an input shaft 99 and the driven plates 85 and 84, defining the interstices 95, are inter-connected via their inner edges in two sets respectively attached to a hollow shaft 100 and an inner shaft 101, which shafts extend through a sealed bearing 102 to opposite bevels 103 and 104 of a differential gear 105. The differential gear is of standard design and has an output shaft 106. The two shafts 100 and 101 are preferably insulated from one another (not shown) and the bevels made from non-conductive material so that the control voltages can be applied to the two shafts directly.

It will be apparent that all of the embodiments described are reversible clutches (from input to output) but in most applications it is of course advisable to select the shaft having the least inertia as the output shaft.

I claim:

1. A viscous shear clutch comprising a housing containing an input shaft journalled in said housing, at least two input pluralities of electrically conductive interconnected drive plates rotatable by the input shaft, at least two output pluralities of electrically conductive interconnected driven plates, the driven plates of each output plurality being non-engageably interleaved in evenly spaced alternating relationship with the drive plates of a respective one of the input pluralities so as to provide a series of intercommunicating interstices interjacent the alternately confronted drive and driven plates, an output shaft journalled in said housing and rotatable by the output pluralities, one of said input and output shafts being connected directly to its respective two pluralities so as to rotate conjointly therewith and the other being connected by gearing to its respective two pluralities so as to rotate differentially therewith, electrical connecting means to each plurality of drive plates and driven plates for the application of control voltages, and an electro-rheological fluid disposed throughout the interstices.

2. A viscous shear clutch as claimed in claim 1 wherein the drive plates and the driven plates are of cylindrical form disposed concentrically for each interleaved pair of input/output pluralities so as to rotate about a respective mutual axis.

3. A viscous shear clutch as claimed in claim 1 wherein the drive plates and the driven plates are disc-shaped and disposed in parallel array for each interleaved pair of input/output pluralities so as to rotate about a respective mutual axis perpendicular to the plates.

4. A viscous shear clutch as claimed in claim 1 wherein the two input pluralities are both arranged to be rotated in the same direction by the input shaft, and the output shaft is arranged to be rotated differentially by the two output pluralities.

5. A viscous shear clutch as claimed in claim 4 wherein the input shaft carries a drive gear which is oppositely engaged with two input gears, each input gear being coaxially attached to a respective one of the two input pluralities, and the two output pluralities each coaxially support a respective one of two interengaged output gears, the output shaft being coaxially attached to one of the output pluralities.

6. A viscous shear clutch as claimed in claims 3 or 4 wherein the input shaft is coaxially attached to both input pluralities, and the two output pluralities each carry a gear ring, the two gear rings being opposingly engaged with an output gear coaxially attached to the output shaft.

7. A viscous shear clutch as claimed in claim 6 wherein the gear rings and the driven plates of each output plurality are sub-divided into separate sectors, each gear ring sector being engaged with a respective output gear and output shaft.

8. A viscous shear clutch as claimed in claims 3 or 4 wherein the input shaft is coaxially attached to both input pluralities via their outer edges and the two output pluralities are centrally mounted upon two respective separately rotatable coaxial shafts each attached to opposing bevels of a differential gear adapted to drive the output shaft.

9. A viscous shear clutch as claimed in claim 2 wherein the two input pluralities each carry a gear ring, which two gear rings are oppositely engaged via idler gears, the input shaft being coaxially attached to one only of the input pluralities, and the output shaft being coaxially attached to both output pluralities.

* * * * *